US009261166B2

(12) United States Patent
Junig et al.

(10) Patent No.: US 9,261,166 B2
(45) Date of Patent: Feb. 16, 2016

(54) PLATE-LINK CHAIN

(75) Inventors: Marcus Junig, Bühl (DE); Anton Simonov, Bühl (DE); Olga Ispolatova, Bühl (DE); Michael Pichura, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 942 days.

(21) Appl. No.: 12/005,174

(22) Filed: Dec. 21, 2007

(65) Prior Publication Data

US 2008/0176694 A1 Jul. 24, 2008

Related U.S. Application Data

(60) Provisional application No. 60/876,708, filed on Dec. 22, 2006.

(51) Int. Cl.
*F16G 13/04* (2006.01)
*F16G 5/18* (2006.01)

(52) U.S. Cl.
CPC . *F16G 13/04* (2013.01); *F16G 5/18* (2013.01)

(58) Field of Classification Search
USPC .................. 474/201, 206, 212–216
See application file for complete search history.

(56) References Cited

U.S. PATENT DOCUMENTS 5,651,746 A * 7/1997 Okuda ........................ 474/215
2003/0119614 A1 6/2003 Saitoh ........................ 474/113

FOREIGN PATENT DOCUMENTS

EP 1 760 361 A1 3/2007
WO WO 2005/108819 A1 11/2005
WO WO 2007/043209 A1 4/2007

* cited by examiner

*Primary Examiner* — Anna Momper
(74) *Attorney, Agent, or Firm* — Alfred J. Mangels

(57) ABSTRACT

A plate-link chain having a plurality of link plates hingedly connected with each other by pairs of rocker members that each include two rocker members. The rocker members extend transversely to the longitudinal direction of the plate-link chain and are situated with play in openings in the link plates. The rocker members and the link plate openings each have respective curved contact surfaces along which the rocker members and the link plates bear against each other to transmit force. The rocker members include curved rolling surfaces along which the rocker members roll against each other during chain operation to transmit force. The play value between the rocker members and the opening in an adjacent link plate is less than 0.2 mm to minimize lateral vibrations of the chain during operation, to prevent contact of the chain with an enclosing housing and thereby reduce emitted noise.

9 Claims, 5 Drawing Sheets

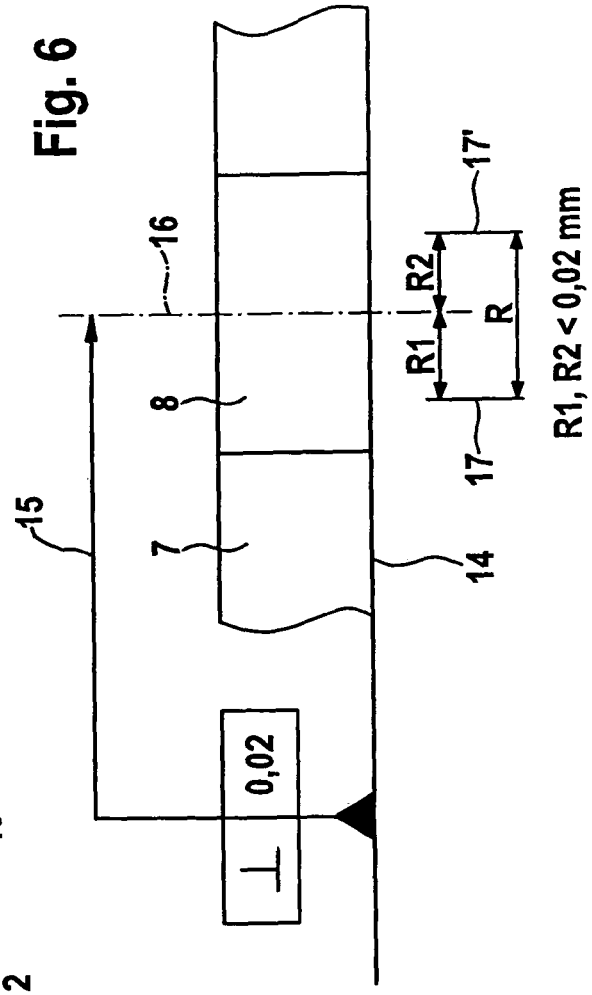

PLATE-LINK CHAIN

BACKGROUND OF THE INVENTION

1. Field of the Invention

The present invention relates to a plate-link chain having a plurality of link plates that are hingedly connected with each other by pairs of rocker members.

2. Description of the Related Art

Plate-link chains generally include rocker member pairs that are composed of two rocker members each, wherein the rocker members extend transversely to the longitudinal direction of the plate-link chain. The rocker member pairs are positioned within openings in the link plates and with some degree of play therebetween. Curved contact surfaces are provided on the rocker members and on the link plates, along which curved surfaces the rocker members and link plates bear against each other to transmit force. The rocker members include curved rolling surfaces along which the rocker members of a rocker member pair roll against each other and/or slide on each other to transmit force.

Such a plate-link chain can be used as a means of transmitting traction force in a belt-driven conical-pulley transmission, or as a toothed plate-link chain in a toothed belt-driven transmission, in motor vehicles or the like, for example. In a plate-link chain the tractive force is transferred by means of frictional contact between outer ends of the rocker members and the conical disk surfaces of the two conical pulleys. In the case of a toothed plate-link chain the tractive force is transferred through meshing of the teeth of the toothed plate-link chain with teeth of the toothed wheels.

In the region of the plate-link chain or toothed plate-link chain that is not encircling the conical pulleys or toothed wheels, i.e., in the region in which the plate-link chain is running freely, the chain can vibrate laterally. That involves transverse vibrations of the chain in the direction of the axes of rotation of the conical pulleys or toothed wheels. Furthermore, vibrations of the plate-link chain or toothed plate-link chain are possible in the direction of force transfer and again perpendicular to the direction of force transfer as so-called strand vibrations.

In particular, lateral vibrations of the plate-link chain or toothed plate-link chain increase the necessary structural space for the housing of a transmission, because striking of the chain against the housing wall should be avoided.

An object of the present invention is therefore to provide a plate-link chain or a toothed plate-link chain that has a small vibration amplitude, in particular in the case of lateral vibrations. In addition, the invention relates to the use of such a plate-link chain in a belt-driven transmission.

SUMMARY OF THE INVENTION

The object is achieved by a plate-link chain having a plurality of link plates hingedly connected with each other by pairs of rocker members that include two rocker members each. The rocker members extend transversely to the longitudinal direction of the plate-link chain and are positioned with some degree of play in openings in the link plates. Curved contact surfaces are provided on the rocker members and on the link plates, along which curved surfaces the rocker members and link plates bear against each other to transmit force. The rocker members include curved rolling surfaces along which the rocker members roll against each other and/or slide on each other to transmit force.

The play between the rocker members and the opening in an adjacent link plate is less than 0.2 mm. A play of from about 0.05 mm to about 0.15 mm has proven to be especially advantageous. As hereafter used herein, the term plate-link chain includes a toothed plate-link chain. In addition, it has proven to be especially advantageous if the link plates have a thickness in a direction transverse to the longitudinal direction of the plate-link chain, and that the play is one fiftieth ($\frac{1}{50}$) to one fifteenth ($\frac{1}{15}$) of the thickness of the link plate. It has been found that due to the play of from about 0.05 mm to about 0.15 mm, or with a play S that is approximately one fiftieth ($\frac{1}{50}$) to one fifteenth ($\frac{1}{15}$) of the thickness of the link plates, a distinct reduction of the tendency of the plate-link chain to vibrate laterally results.

A refinement of the plate-link chain in accordance with the invention provides that the openings have play reduction points that limit the play locally to from about 0.05 mm to about 0.15 mm, and/or to one fiftieth ($\frac{1}{50}$) to one fifteenth ($\frac{1}{15}$) of the thickness of the link plates. Instead of limiting the play across the entire contour of the openings or rocker members, the desired effect can be achieved through individual selected locations at which there is less play.

In a further preferred embodiment of the plate-link chain in accordance with the present invention there is provided a perpendicularity tolerance of the inner surface of the openings that is smaller than 0.02 mm. In another preferred embodiment of the plate-link chain in accordance with the present invention, it is provided that the openings have at least three regions that are curved convexly inward. The convexly-inwardly-curved regions limit the ability of the rocker members to twist relative to the link plates. Preferably, the rocker members are asymmetrically formed in a cross section running in the longitudinal direction of the plate-link chain in the direction of the rocker member height. The asymmetrical design results in a more favorable introduction of the pressure forces in the region of the contact surfaces between the rocker members and the link plates.

The object identified earlier is also achieved by the use of a plate-link chain in accordance with the invention in a belt-driven transmission, in particular as a plate-link chain in a belt-driven conical-pulley transmission with a continuously variable transmission ratio, or as a toothed plate-link chain in a toothed wheel transmission.

BRIEF DESCRIPTION OF THE DRAWINGS

The structure, operation, and advantages of the present invention will become further apparent upon consideration of the following description, taken in conjunction with the accompanying drawings in which:

FIG. 4 is a longitudinal cross section through a plate-link chain in accordance with the present invention in a top view;

FIG. 5 is a section through a plate-link chain in accordance with the invention corresponding to the view of the plate-link chain in FIG. 4;

FIG. 6 is an enlarged, fragmentary top view of a link plate of FIG. 5;

DESCRIPTION OF THE PREFERRED EMBODIMENTS

Figure 1:
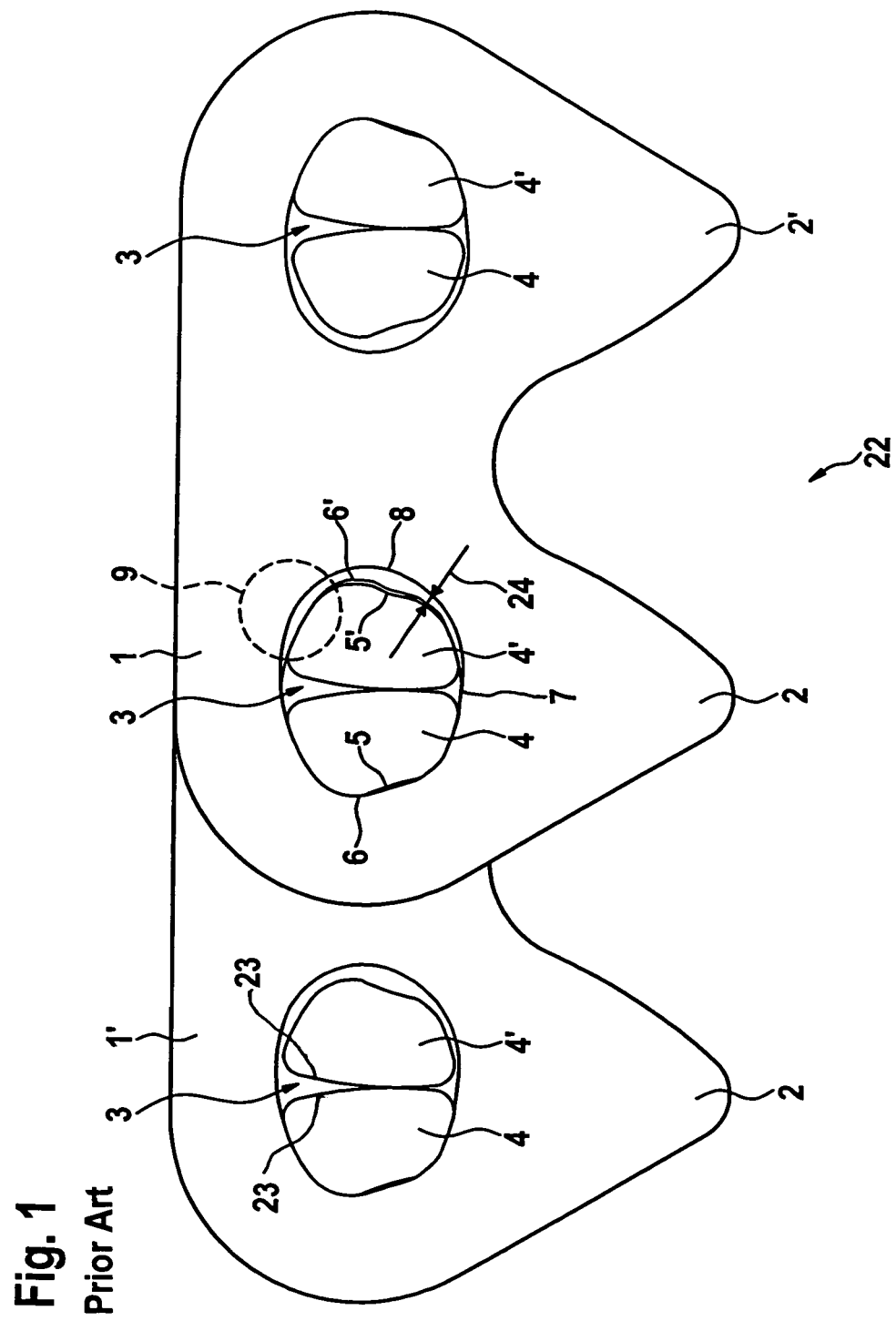
FIG. 1 is a side view of a toothed plate in accordance with the existing art.

FIG. 1 shows link plates 1 and 1', which are designed as toothed plates, as a detail of a toothed plate-link chain 22 that is otherwise not shown. In the case of a toothed plate-link chain the link plates 1 and 1' are provided with two teeth 2 and 2'; in a plate-link chain the teeth 2 and 2' are omitted. Plate-link chain 22 is formed in a known manner by the alternating overlapping arrangement of link plates 1 and 1', whereby the link plates 1, 1' forming part of adjacent chain links are hingedly connected to each other by rocker member pairs 3. The rocker member pairs 3 each include a first rocker member 4 and a second rocker member 4', which roll against each other on respective rolling surfaces 23 when plate-link chain 22 bends as it passes around a pulley. Each rocker member pair 3 is received in a receiving opening 7 of link plate 1; the receiving opening 7 includes a contact surface 6.

In the representation in FIG. 1, rocker member 4 bears against the contact surface 6 of link plate 1, while rocker member 4' bears against the contact surface 6' of the adjacent link plate 1'. Rocker member 4 has a curved contact surface that bears against the contact surface 6 of receiving opening 7 of link plate 1. Rocker member 4' has a corresponding curved contact surface 5' that bears against the contact surface 6' of a receiving opening in link plate 1', which is laterally adjacent to link plate 1. The surface 8 of receiving opening 7 located opposite the contact surface 6 is designed so that a gap 24 is formed between the curved surface 5' of rocker member 4', which bears against a receiving opening in the adjacent link plate 1', and surface 8 of receiving opening 7. Thus, rocker member 4' does not touch the surface 8 of receiving opening 7 of link plate 1. A corresponding gap also exists between rocker member 4 and the surface of a corresponding receiving opening in link plate 1'.

Figure 2:
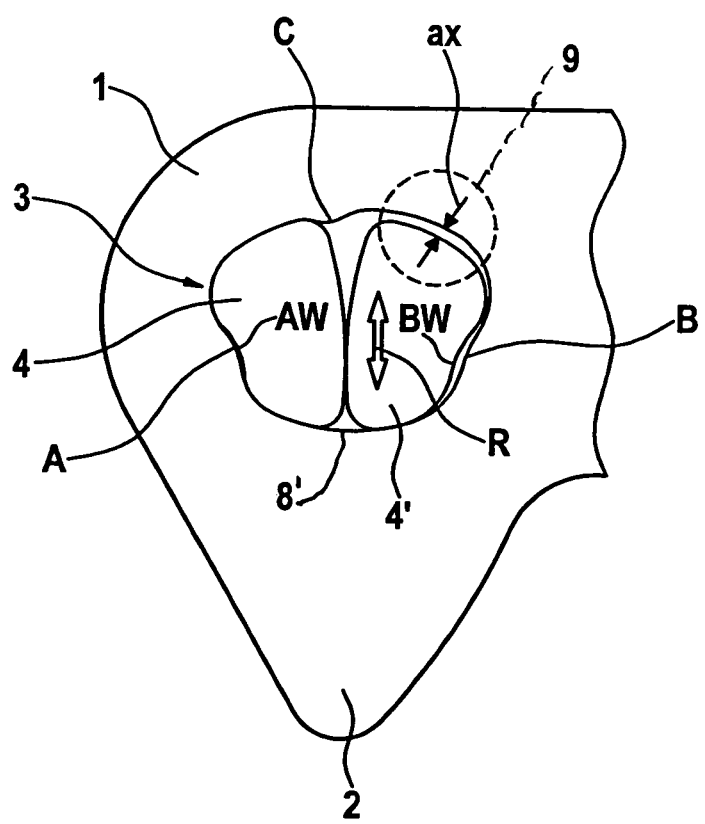
FIG. 2 is a portion of a further tooth plate in accordance with the existing art.

FIG. 2 shows a detail of a further known link plate 1. The adjacent link plate 1' is not shown, and only the left part of the link plate 1 corresponding to the representation in FIG. 1, and associated with tooth 2, is shown. Receiving opening 8' has three convexly curved lobes A, B, and C that extend inwardly into receiving opening 8'. Rocker member 4 of rocker member pair 3 has a concave contraction AW which is associated with and is opposite to lobe A, while rocker member 4' has a contraction BW that is associated with and is opposite to lobe B. Contraction AW bears against lobe A when the chain bends. Correspondingly, the contraction BW of rocker member 4' bears against lobe B when the plate-link chain bends, and thus excessive twisting of the rocker members 4 and 4' against each other is prevented, in particular if the plate-link chain swings back.

The lobe C, situated toward the upper surface of the chain, when viewed in the running direction, serves to secure the rocker members 4 and 4' against twisting when the plate-link chain bends. A dashed circle 9 in FIGS. 1 and 2 clearly shows a region with a relatively large spacing between the surface of rocker member 4' and the surface of receiving opening 8' of link plate 1. In the embodiment of the plate-link chain in accordance with FIG. 2, possible motion in the direction of double headed arrow R of the rocker member 4' relative to rocker member 4 is determined by the distance ax between the surface of rocker member 4' and the surface of receiving opening 8' of link plate 1.

Figure 3A:
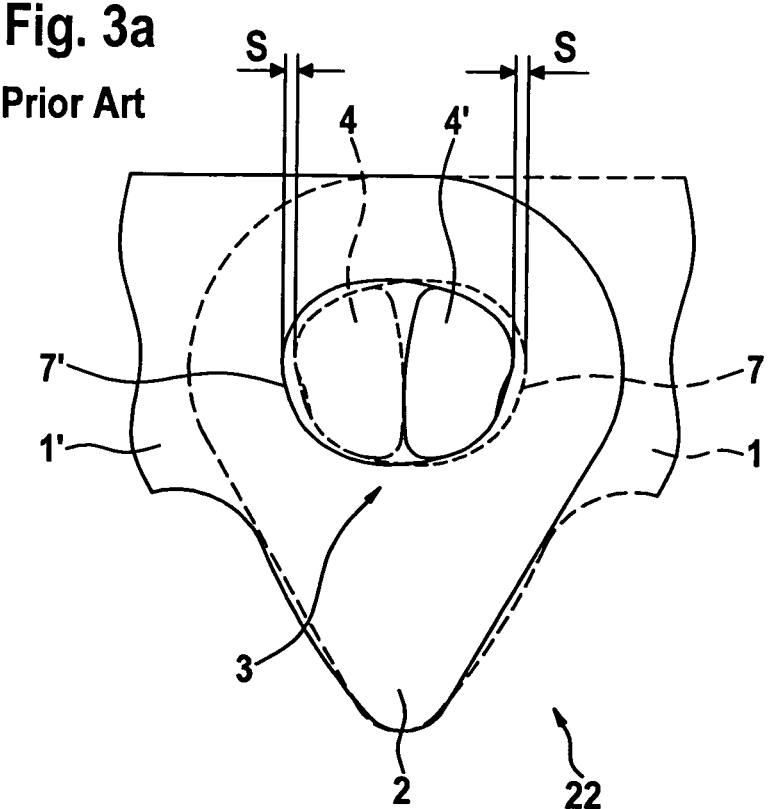
FIG. 3a is an illustration of the play of a rocker member pair in openings of the link plates of a toothed plate-link chain in accordance with the existing art.

FIG. 3a shows a side view of two known link plates 1 and 1' corresponding to the representation in FIG. 1, to clearly show the play between the rocker members and the two link plates 1 and 1'. A play value designated as S between the rocker members and the link plates 1 and 1' is caused by the loose reception of the rocker member pair 3 in the receiving opening 7 of link plate 1 and the receiving opening 7' of link plate 1'. Link plate 1, as well as the receiving opening 7 of link plate 1 and the rocker member 4 supported in receiving opening 7, are shown in dashed lines in FIG. 3a. Link plate 1', the associated receiving opening 7' and the rocker member 4' supported in the receiving opening are shown with solid lines. The link plates 1 and 1' have a play value S relative to the rocker member pairs 3. The two link plates 1 and 1' can thus be moved relative to each other by the play value 2S. For a known plate-link chain the play is about 0.2 mm, so that the total play within the entire length of the known plate-link chain adds up to several millimeters.

Figure 3B:
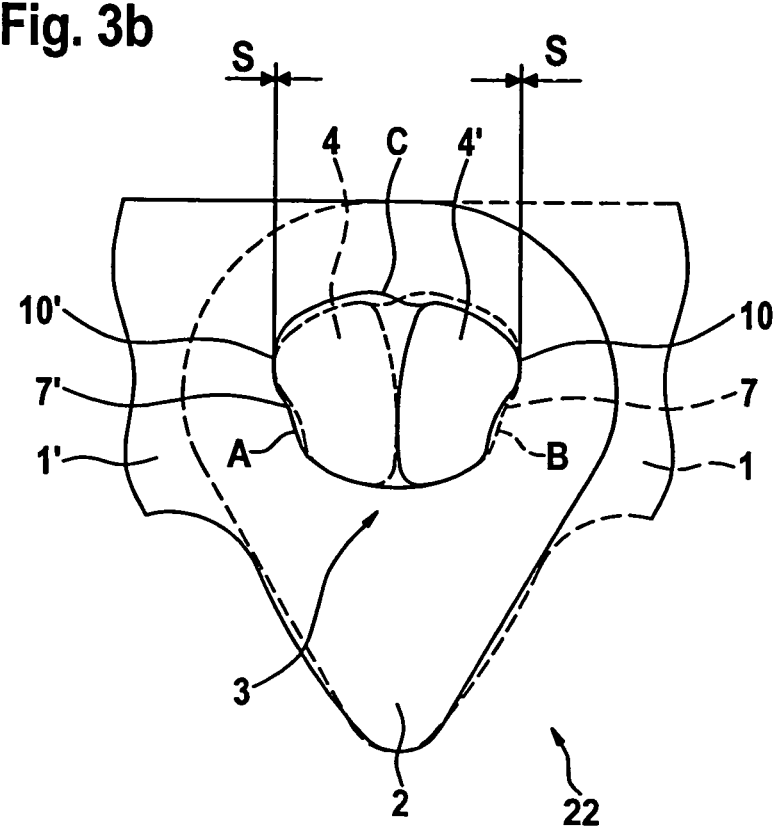
FIG. 3b is an illustration of the play of a rocker member pair in openings of the link plates of a toothed plate-link chain in accordance with an embodiment of the present invention.

FIG. 3b shows two link plates 1 and 1' of a plate-link chain 22 in accordance with the present invention, wherein the play value S is reduced to a value of from about 0.05 mm to 0.15 mm. The reduction of the play from 0.2 mm in the known chains to a value of between 0.05 mm to 0.15 mm can occur locally at one place, for example at a local play reduction point 10 or 10' as shown in FIG. 3b. The local play reduction points 10 and 10' are preferably situated so that they cause the play reduction only when the plate-link chain is not bent, so that in the bent state the play reduction points nevertheless do not come into contact with the rocker members 4 or 4'. FIG. 3b shows the play reduction for a toothed plate-link chain corresponding to the representation of the link plate in FIG. 2, i.e., a toothed plate-link chain in which the individual chain links are provided with lobes A, B, and C. However, the play value reduction to S=0.05 mm to 0.15 mm can also be made with a plate-link chain in accordance with FIG. 1, i.e., a plate-link chain without lobes.

The reduction of the play value S by local play reduction points 10 and 10' is accomplished in that the receiving openings 7 and 7' have a zone in the region of the opening surfaces 8 or 8' that reduces the play to a value of S=0.05 to 0.15 mm, in particular when the plate-link chain is not bent. In that case the play S is about one fiftieth (1/50) to one fifteenth (1/15) of the thickness b of link plate 1. The thickness b of link plate 1 is shown in FIGS. 4 and 5 and is the thickness of the link plates measured in the transverse direction in a top view of the plate-link chain.

Figure 7:
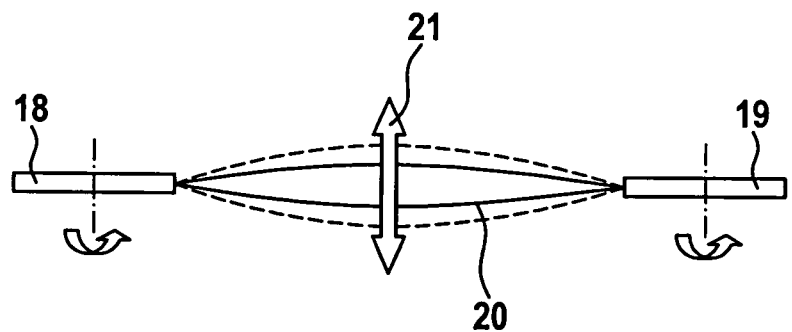
FIG. 7 is a schematic top view of a belt-driven transmission having a toothed plate-link chain in accordance with the present invention or a toothed plate-link chain in accordance with the existing art to illustrate the lateral vibrations of the chain.

It has been found that because of the reduced play to a value of 0.05 mm to 0.15 mm, or with a play-value S that is approximately one fiftieth (1/50) to one fifteenth (1/15) of the thickness of the link plates, a distinct reduction of the tendency of the plate-link chain to vibrate laterally results, which vibratory mode is shown in FIG. 7.

FIGS. 4 and 5 each show fragmentary longitudinal cross-sections through a plate-link chain in accordance with the invention in top views. The figures show stacks of portions of link plates of two adjacent chain links corresponding to the representation in FIGS. 3a and 3b, with one link plate 1 and two link plates 1' of two adjacent chain links shown. Because of the play value S represented in FIGS. 3a and 3b, rocker members 4 and 4' are able to carry undergo a tilting motion in the longitudinal direction of the plate-link chain. As shown in FIG. 4, the longitudinal axis 11 of the rocker member pair 3, or of rocker members 4 and 4', then deviates from the transverse axis 12 of the plate-link chain by a tilt angle α. Transverse axis 12 is perpendicular to the chain running direction, which is shown in FIG. 4 by double headed arrow 13. The reduction of the play value S in accordance with the present invention causes the tilt angle α to be reduced, as shown in FIG. 5.

An additional reduction of the play value S and of the tilt angle α is achieved by the perpendicularity tolerance of the inner surfaces of the receiving openings 7 and 7' of the link plates 1 having a value smaller than 0.02 mm. To illustrate the perpendicularity tolerance R, a reference surface 14 and an arrow 15 are shown in FIG. 6. In that respect the illustrated representation corresponds to DIN ISO 1101. A tolerance axis 16 of the receiving opening 7 or 7' of a link plate 1 or 1' must be spaced at a distance less than 0.02 mm between two parallel planes 17 and 17', which are perpendicular to reference surface 14 and to the direction of arrow 15. For clarification this is shown in FIG. 6 in enlarged form on the basis of the chain link 1' shown in FIG. 5. The distances R1 and R2 from tolerance axis 16 to reference planes 17 and 17' are both smaller than 0.02 mm. The distances R1 and R2 from axis 16 to reference surfaces 17 and 17' add up to the perpendicularity tolerance R, where R1<R and R2<R.

FIG. 7 illustrates the effect of the play reduction in accordance with the present invention, and of the reduction of the perpendicularity tolerance R in accordance with the present invention. FIG. 7 shows a schematic top view of a belt-driven transmission including a first toothed wheel 18 and a second toothed wheel 19, each of which is encircled by a toothed plate-link chain 20. When the belt-driven transmission is in operation the plate-link chain 20 can execute lateral vibrations, the directions of which are identified by double headed arrow 21. The lines representing the maximum excursion of chain 20 are shown as dashed lines for a known toothed plate-link chain 20, and as solid lines for a toothed plate-link chain in accordance with the present invention. The tendency to vibrate laterally, i.e., the excursions in the directions indicated by the double headed arrow 21, is reduced significantly by the design of the plate-link chain or toothed plate-link chain in accordance with the present invention. As a result, the plate-link chain in accordance with the present invention does not strike against a housing wall of the belt-driven transmission, so that acoustic emissions resulting from the lateral vibration of the are reduced.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain comprising: a plurality of hingedly connected link plates including longitudinally adjacent link plates and laterally adjacent link plates, wherein the laterally adjacent link plates are offset in a longitudinal direction of the chain relative to neighboring longitudinally adjacent link plates and are hingedly connected by pairs of rocker members that each include two rocker members, wherein the rocker members extend transversely to the longitudinal direction of the plate-link chain and are situated in rocker-member-receiving openings in the link plates with a predetermined play value between an outer transversely-extending surface of the rocker members and inner surfaces of ones of the rocker-member-receiving openings, wherein the predetermined play value is a clearance that exists between facing surfaces of ones of the rocker members that face a link plate opening surface and opposed surfaces of the rocker-member-receiving openings in the link plates in a longitudinal direction of the chain when the chain is in an extended condition and is in operation and under tension to transmit force, wherein the rocker-member-receiving openings of the link plates include at least three peripherally-spaced inner surface regions that extend inwardly and that are convexly curved, wherein the rocker members are shaped asymmetrically in a height direction of the rocker members relative to a cross section plane running in the longitudinal direction of the plate-link chain and passing through a center region of the respective rocker members, the rocker members and link plates including respective curved contact surfaces along which the rocker members and link plates bear against each other to transmit force, the rocker members including curved rolling surfaces along which adjacent rocker members of a rocker member pair roll against each other to transmit force, wherein for a first link plate a forward rocker member pair relative to a chain movement direction includes a leading rocker member and a trailing rocker member that are in contact with each other at their respective rolling surfaces, wherein the leading rocker member of the forward rocker member pair is in contact with a longitudinally forward surface of a forward link plate opening of the first link plate and is spaced by the predetermined play value from a longitudinally forward surface of a rearward rocker-member-receiving opening of a second, longitudinally offset and laterally adjacent link plate and wherein the trailing rocker member of the forward rocker member pair is spaced by the predetermined play value from a longitudinally rearward surface of the forward rocker-member-receiving opening of the first link plate and is in contact with a longitudinally rearward surface of a rearward rocker-member-receiving opening of a laterally adjacent and longitudinally offset second link plate, wherein for the first link plate a rearward rocker member pair relative to a chain movement direction includes a leading rocker member and a trailing rocker member that are in contact with each other at their respective rolling surfaces, wherein the trailing rocker member of the rearward rocker member pair is in contact with a longitudinally rearward surface of the rearward rocker-member-receiving opening of the first link plate and is spaced by the predetermined play value from a longitudinally rearward surface of the forward rocker-member-receiving opening of the second, longitudinally offset and laterally adjacent link plate and wherein the leading rocker member of the rearward rocker member pair is spaced by the predetermined play value from a longitudinally forward surface of the rearward rocker-member-receiving opening of the first link plate and is in contact with a longitudinally forward surface of a forward rocker member-receiving opening of the laterally adjacent and longitudinally offset second link plate, wherein the predetermined play value in the longitudinal direction of the plate-link chain between a rocker member contact surface and a surface of a rocker-member-receiving opening is smaller than 0.2 mm to reduce tilt angles of rocker members relative to a transverse axis of the plate-link chain and to reduce chain strand lateral vibration amplitude during chain operation to avoid chain contact with an adjacent housing surface and thereby avoid resulting chain-vibration-induced noise.

2. A plate-link chain in accordance with claim 1, wherein the predetermined play value is between 0.05 mm and 0.15 mm.

3. A plate-link chain in accordance with claim 1, wherein the link plates have a thickness dimension in a direction transverse to the longitudinal direction of the plate-link chain and the predetermined play value is between 1/50 and 1/15 of the thickness dimension of the link plates.

4. A plate-link chain in accordance with claim 2, wherein the rocker member receiving openings of each of the link plates have a plurality of longitudinally opposed play reduction points for contact with a rocker member during operation of the chain, to limit the predetermined play value to between 0.05 mm and 0.15 mm.

5. A plate-link chain in accordance with claim 2, wherein the rocker member receiving openings of each of the link plates have a plurality of longitudinally opposed play reduction points for contact with a rocker member during operation of the chain, wherein the play reduction points limit the play value to between $1/50$ and $1/15$ of the thickness of the link plates.

6. A plate-link chain in accordance with claim 1, wherein a perpendicularity tolerance of each of the longitudinally opposed inner surfaces of the rocker member receiving openings relative to an intermediate tolerance axis that extends perpendicular to the longitudinal direction of the plate-link chain is smaller than 0.02 mm.

7. A belt-driven transmission including a plate-link chain in accordance with claim 1.

8. A plate-link chain comprising: a plurality of hingedly connected link plates including longitudinally adjacent link plates and laterally adjacent link plates, wherein the laterally adjacent link plates are offset in a longitudinal direction of the chain relative to neighboring longitudinally adjacent link plates and are hingedly connected by pairs of rocker members that each include two rocker members, wherein the rocker members extend transversely to the longitudinal direction of the plate-link chain and are situated in rocker-member-receiving openings in the link plates with a predetermined play value between an outer transversely-extending surface of the rocker members and inner surfaces of ones of the rocker-member-receiving openings, wherein the predetermined play value is a clearance that exists between facing surfaces of ones of the rocker members that face a link plate opening surface and opposed surfaces of the rocker-member-receiving openings in the link plates in a longitudinal direction of the chain when the chain is in an extended condition and is in operation and is under tension to transmit force, wherein the rocker-member-receiving openings of the link plates include at least three peripherally-spaced inner surface regions that extend inwardly and that are convexly curved, wherein the rocker members are shaped asymmetrically in a height direction of the rocker members relative to a cross section plane running in the longitudinal direction of the plate-link chain and passing through a center region of the respective rocker members, the rocker members and link plates including respective curved contact surfaces along which the rocker members and link plates bear against each other to transmit force, the rocker members including curved rolling surfaces along which adjacent rocker members of a rocker member pair roll against each other to transmit force, wherein for a first link plate a forward rocker member pair relative to a chain movement direction includes a leading rocker member and a trailing rocker member that are in contact with each other at their respective rolling surfaces, wherein the leading rocker member of the forward rocker member pair is in contact with a longitudinally forward surface of a forward link plate opening of the first link plate and is spaced by the predetermined play value from a longitudinally forward surface of a rearward rocker-member-receiving opening of a second, longitudinally offset and laterally adjacent link plate, and wherein the trailing rocker member of the forward rocker member pair is spaced by the predetermined play value from a longitudinally rearward surface of the rocker-member-receiving opening of the first link plate and is in contact with a longitudinally rearward surface of a rearward rocker-member-receiving opening of a laterally adjacent and longitudinally offset second link plate, wherein for the first link plate a rearward rocker member pair relative to a chain movement direction includes a leading rocker member and a trailing rocker member that are in contact with each other at their respective rolling surfaces, wherein the trailing rocker member of the rearward rocker member pair is in contact with a longitudinally rearward surface of the rearward rocker-member-receiving opening of the first link plate and is spaced by the predetermined play value from a longitudinally rearward surface of the forward rocker-member-receiving opening of the second, longitudinally offset and laterally adjacent link plate and wherein the leading rocker member of the rearward rocker member pair is spaced by the predetermined play value from a longitudinally forward surface of the rearward rocker-member-receiving opening of the first link plate and is in contact with a longitudinally forward surface of a forward rocker-member-receiving opening of the laterally adjacent and longitudinally offset second link plate, wherein the predetermined play value in the longitudinal direction of the plate-link chain between a rocker member contact surface and a surface of a rocker-member-receiving opening is between 0.05 mm and 0.15 mm, wherein the link plates have a thickness dimension in a direction transverse to the longitudinal direction of the plate-link chain and the predetermined play value is between $1/50$ and $1/15$ of the thickness dimension of the link plates, to reduce tilt angles of rocker members relative to a transverse axis of the plate-link chain and to reduce chain strand lateral vibration amplitude during chain operation to avoid chain contact with an adjacent housing surface and thereby avoid resulting chain-vibration-induced noise.

9. A plate-link chain in accordance with claim 8, wherein a perpendicularity tolerance of each of the longitudinally opposed inner surfaces of the rocker member receiving openings relative to an intermediate tolerance axis that extends perpendicular to the longitudinal direction of the plate-link chain is smaller than 0.02 mm.

* * * * *